3,546,104
HYDRODESULFURIZATION OF PETROLEUM HY-
DROCARBONS CONTAINING ASPHALTENES
Tsutomu Kuwata and Yutaka Oguchi, Tokyo, and
Hirotsugu Nomura, Kawasaki-shi, Japan, assignors to
Nippon Oil Company Ltd., Tokyo, Japan, a corpora-
tion of Japan
Filed May 8, 1968, Ser. No. 727,463
Int. Cl. C10g 23/02, 23/04
U.S. Cl. 208—216                                10 Claims

ABSTRACT OF THE DISCLOSURE

A petroleum hydrocarbon containing asphaltenes is contacted with hydrogen and a catalyst, which is either an amorphous alumina or silica-alumina carrier, with a metal, such as, copper, platinum, nickel, cobalt or molybdenum. The carrier is obtained by gelling an aqueous colloidal solution of (1) basic aluminum sulfate having the composition represented by the formula, $$Al_2O_3 \cdot (0.8–1.6) SO_3$$

Figure 3:
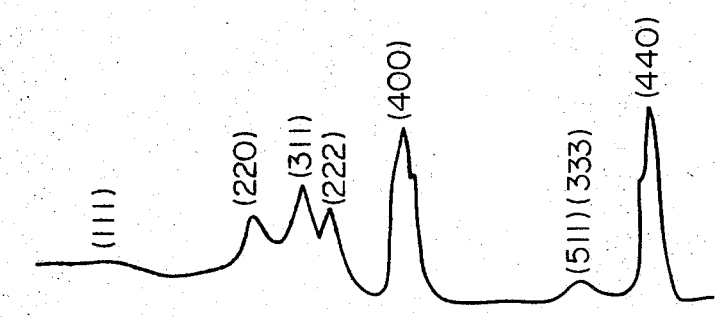

or (2) a mixed solution of said basic aluminum sulfate and an aqueous sol of silica at a temperature of 40–100° C. to form hydrogels. Water is added to the hydrogels to adjust molar ratio of $Al_2O_3:SO_3$ to 1:0.4–0.7 and the hydrogels are then treated with a base to remove sulfate radicals therefrom. The carrier and metal component are calcined at 350–800° C.

---

This invention relates to a process for hydrodesulfurizing the petroleum hydrocarbon containing asphaltenes, using an improved catalyst.

With regards to the process for the hydrodesulfurization of petroleum, various refining processes have been developed and put to practice commercially when distilled oils are used as the feed stock. However, with regards to the treatment of petroleum hydrocarbons containing asphaltenes, particularly heavy oils, fractions containing the distillation residual oils and crude petroleum oils, the lowering of the catalytic activity due to the asphaltenes and metals in the feed stock was exceedingly great, resulting in a shortening of the catalytic life and hence making the continuous operation over a long period of time difficult. For instance, distillation residual oils, crude petroleum oils and the like contain about 1–15% by weight of asphaltenes, and the asphaltenes tend to cause a separation of carbonaceous materials during the hydrogenation reaction, and the carbonaceous materials deposited on the catalyst surface covers the activity sites thereby causing the lowering of the catalytic activity. It is also known that the metals present in asphaltenes (principally vanadium and nickel) also become deposited on the surface of the catalyst to become an important cause of the lowering of the catalytic activity. The carbonaceous materials are readily eliminated by burning, and therefore if the catalyst whose catalytic activity has been reduced is regenerated, it can be used repeatedly. However, this is not desirable when the rate of deposition of the carbonaceous materials is fast, since the regeneration operation must be carried out by interrupting operations at short-period cycles. On the other hand, since the catalyst on which metals have been deposited are difficult to regenerate, it must be exchanged for a fresh catalyst after a certain amount of the metals has been deposited. Accordingly, when the rate of deposition of the metals is fast, not only the operating cycle becomes short, but also the expense of the catalyst becomes costly thereby resulting in an economic disadvantage.

On the other hand, in the case of the hydrocracking of heavy oils various processes have already been developed and put to commercial practice. The utilization of these processes for the desulfurization of distillation residual oils has been considered, but in this case the formation of cracked light oils occurs and the yield of the heavy oil fraction declines, thus making it undesirable.

The object of the present invention is to provide a process for hydrodesulfurizing the petroleum hydrocarbon containing asphaltenes using an improved catalyst having great desulfurization activity, whose decline in catalytic activity has been prevented by controlling the deposition on the catalyst surface of the asphaltenes and metals in the residual oil; which does not accelerate the cracking of the feed stock oil; and which moreover has superior strength.

The foregoing object is achieved in accordance with the present invention by a process wherein in the hydrodesulfurizing of petroleum hydrocarbon by contacting the petroleum hydrocarbons containing asphaltenes with a hydrorefining catalyst in the presence of hydrogen, at least 50% of the sulfur contained in the aforesaid hydrocarbons is removed therefrom by contacting the hydrocarbon with a catalyst comprising either an amorphous alumina carrier obtained from an aqueous colloidal solution of basic aluminum sulfate or an amorphous silica-alumina carrier obtained from a mixed solution of an aqueous solution of the aforesaid basic aluminum sulfate and a silica sol, the ratio of $SiO_2/(Al_2O_3+SiO_2)$ of which is not more than 0.3, on which carrier has been supported a metallic component having activity in hydrorefining of petroleum hydrocarbon.

We found that of the various water-soluble aluminum compounds the alumina or silica-alumina prepared from the aqueous solution of basic aluminum sulfate, when used as the carrier of a hydrodesulfurization catalyst, provided a particularly excellent catalyst whose desulfurizing activity in the hydrodesulfurization of petroleum hydrocarbons containing asphaltenes, such as distillation residual oils, was greater than in the case of the conventional alumina or silica-ilumina carriers which are used for catalysts of this kind. We further found that the catalytic life was also longer.

The catalyst of the present invention acan be prepared in the following manner. Either an aqueous colloidal solution of basic aluminum sulfate (hereinafter referred to as stock solution "A") or a mixed solution of an aqueous colloidal solution of basic aluminum sulfate and silica sol (hereinafter referred to as "B") is rendered into hydrogels by heating, following which the resulting hydrogels, after water-washing, are contacted with an aqueous solution of a base to remove the sulfate radical thereby forming alumina hydrogels or silica-alumina hydrogels. These hydrogels, in their as-obtained state or after drying or calcining, are deposited with a metallic component having activity in hydrorefining of hydrocarbons.

The basic aluminum sulfate that is used in this invention is preferably one having the composition $$Al_2O_3 \cdot (0.8–1.6) SO_3$$

Stock solution "A" is commercially obtained as a supernatant by adding a calcium carbonate powder gradually to a concentrated aqueous aluminum sulfate solution with vigorous stirring to precipitate the sulfate radical as calcium sulfate. The molar ratio of $SO_3/Al_2O_3$ in this aqueous solution is suitably adjusted to come within the range of 0.8–1.6. Stock solution "B" is obtained by mixing the stock solution "A" with a silica sol. If the amount of the silica component becomes great, the hydrogelation of said solution becomes difficult and in order to accomplish its gelation it is necessary to hold the weight ratio of $SiO_2/(Al_2O_3+SiO_2)$ of the stock solution "B" to 0.55 or less. The addition of the silica component provides still better results in that the thermal stability of the catalyst improves and its specific surface area is increased. However, since the addition of the silica component in large amounts accelerates the cracking of the hydrocarbons, it must be added in a range which will not increase the amount of hydrocarbons cracked. Hence, the weight ratio of $SiO_2/(Al_2O_3+SiO_2)$ of the carrier must be not more than 0.3. In the case of the silica-aluminum carrier, in order to improve fully the desulfurizing activity of the catalyst while preventing the cracking of the hydrocarbons, it is particularly preferred that the silica is added to the carrier in an amount of 5–15% by weight, calculated as $SiO_2$.

Ions such as $Na^+$, $K^+$, $Mg^{++}$, $Ca^{++}$, $Zn^{++}$, $Fe^{++}$ and $NH_4^+$ may be present as impurities in the aqueous aluminum sulfate solution used as the starting material herein.

Since stock solution "A" and "B" have the property of gelling by heating, they are rendered into hydrogels by utilizing this characteristic. The addition of 10–30% by weight of water to the stock solutions prior to heating is to be preferred for promoting the uniform hydrogelation of the solution, which can be readily accomplished by heating the solutions to a temperature of 40° to 100° C. In this case, the gelation can be carried out either by placing the stock solution in a suitable vessel wherein the gelation of the whole solution is effected while being contained in the vessel or it can also be gelled by being sprayed into an atmosphere heated at 40° to 100° C. However, the method of hydrogelation in which the stock solution is passed through a water-immiscible solvent, for example, a petroleum hydrocarbon, heated at 40–100° C. is convenient. According to this method, the solution is rendered into spheroidal hydrogels by means of the surface tension, with the consequence that a spheroidal carrier having very excellent mechanical strength can be obtained. In this case, the size of the hydrogels, and hence the size of the catalyst, can be adjusted over a broad range by a choice of a suitable relationship between the nozzle used for jetting the stock solution into the heated solvent, the difference in the specific gravities between the stock solution and the solvent, the viscosity of the stock solution and the surface tension. Further, the heating time must be strictly prescribed for obtaining a perfectly spheroidal catalyst, this time and temperature being decided by the size of the hydrogels. Again, it is desirable to ensure that gas in solution in the stock solution is completely removed beforehand to preclude the formation of cracks during the hydrogelation. Further, it is preferred that the gelation be carried out so as to form granular or spheroidal gels whose final particle size as catalyst range from 0.002–30 mm., and preferably 0.5 to 8 mm., in diameter.

The resulting hydrogels have sulfate radicals removed by contacting them with an aqueous solution of a base in their as-obtained state or after water-washing. For accelerating the speed of water-washing and/or neutralization at this time and thus shortening the time required for these operations, the use of hydrogels of small size is to be preferred. For this purpose, either small particles in the particle range previously noted are formed beforehand or the gel mass is suitably ground.

In this invention, the sulfate radical is preferably removed by first washing the freshly formed hydrogels with water and thereafter neutralizing the hydrogels with an aqueous solution of a base. The freshly formed hydrogels are very unstable and, if left standing, they have a property of reverting to the sol solution. Therefore, fresh cold or hot water is poured in and the hydrolysis thereof is effected thereby removing a part of the sulfate radicals to reduce the molar ratio of $SO_3/Al_2O_3$ to about 0.4–0.7. Not only is the hydrogel stabilized by this operation, but also the impure salts contained in the stock solution are eliminated.

Next, by raising the pH by contacting the hydrogel with an aqueous alkaline solution, the residual sulfate radicals are eliminated as sulfates. For obtaining perfect spheroidal hydrogels especially, it is necessary to raise the pH gradually. It is not desirable to raise the pH abruptly, since cracks are formed in the hydrogels, resulting in breakage during drying or a decline in the compression strength or resistance to attrition, with the consequence that they become easily crushed. As the alkali it is preferred to use a substance which does not cause either alkali metals or alkaline earth metals to remain in the hydrogel, for example, ammonia or urea.

After completion of the alkali treatment, water-washing is carried out to remove the sulfates as completely as possible, whereupon either alumina hydrogels or silica-alumina hydrogels, whose content of water is 60–99% by weight, are obtained.

The hereinabove described alumina or silica-alumina hydrogels, which are to be used in the present invention, are substantially amorphous even after calcining for several hours at 350–600° C. The invention gel can be distinguished in this respect from the gel used for the alumina carriers for catalysts of this kind.

Figure 2:
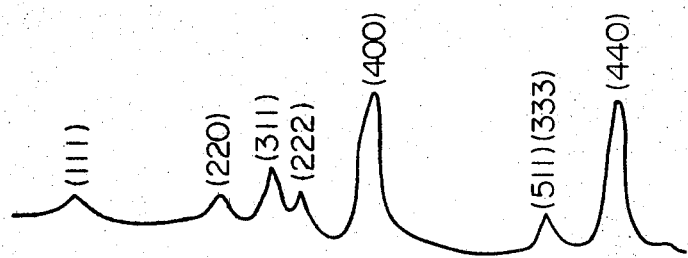
Figure 1:
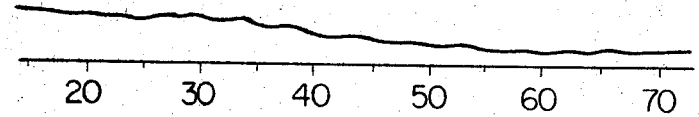

For a better understanding of the invention, reference is made to the accompanying drawing, wherein FIG. 1 is an X-ray diffraction pattern of the alumina hydrogel used in the present invention when it was calcined for 3 hours at 500° C. and X-ray diffraction patterns of commercially available γ-alumina and η-alumina are also shown for comparison's sake in FIG. 2 and FIG. 3, respectively. It is apparent from this pattern that the invention alumina carrier is substantially amorphous. The catalysts which were heretofore used in the hydrorefining or hydrodesulfurization of the petroleum hydrocarbon were in all cases those which used the crystalline aluminas such as alpha-alumina, beta-alumina, gamma-alumina and eta-alumina, and it was entirely unexpected that the substantially amorphous alumina carrier obtained from basic aluminum sulfate could become an excellent carrier for the hydrodesulfurization catalyst. It was, however, surprising to find that when a hydrodesulfurization catalyst was prepared using as its carrier the alumina or silica-alumina gels prepared from basic aluminum sulfate in accordance with the present invention this catalyst demonstrated exceedingly great desulfurization activity without accelerating the cracking of the feed stock oil and, in addition, the deposition on the catalyst surface of the asphaltenes and metals contained in the feed stock oil was inhibited. In the case of an alumina-silica carrier obtained from the water-soluble aluminum salts other than basic aluminum sulfate, for example, sodium aluminate and aluminum nitrate, the improvement of the catalyst, as hereinabove noted, cannot possibly be expected.

Various means can be employed for supporting the metallic component possessing hydrodesulfurization activity with said carrier. As the active metal, the various metals which can be used as catalyst for hydrorefining or hydrodesulfurization are used. Usually, one or more metals selected from the metals of Groups I, VI and VIII of the Periodic Table are used, of which particularly suitable are copper, platinum, nickel, cobalt and molybdenum.

The catalyst is prepared in customary manner. For example:

(1) for obtaining a spheroidal catalyst the spheroidal hydrogels, or the spheroidal carriers obtained after drying or drying and calcining the hydrogel, are immersed in an aqueous solution of the active metal compound followed by drying or drying and calcining. As the spheroidal alumina or silica-alumina hydrogels, those containing up to 90% by weight of water can be used. The drying of the spheroidal hydrogels is accomplished by heating for a period of from 10 to 50 hours at a temperature of 100–200° C. in the presence of saturated steam. On the other hand, for calcining dried gels of alumina or silica-alumina, the foregoing dried spheroidal gels are heated further for 1–5 hours, and preferably 2–3 hours at a temperature of 300–900° C., and preferably 350–750° C. By drying or further calcining of the spheroidal hydrogels under these conditions, it becomes possible to obtain dried or calcined spheroidal carriers which are compact and excel in mechanical strength without breaking the spheroidal gels.

For supporting the active metal, the aforesaid spheroidal hydrogels or dried or calcined carriers are immersed in an aqueous solution of one or more of the water-soluble compounds of the metals of Groups I, VI and VIII of the Periodic Table. The water-soluble compounds of the aforesaid metals may be a water-soluble salt in which the active metal is a cation, such as nitrates, sulfates and formates of the aforesaid metals, or an oxyacid or a salt thereof of the foregoing metals such as molybdic acid, tungstic acid and the ammonium salts thereof. These active metal components are preferably impregnated in an amount, calculated as the elements thereof, of 1–20% by weight, and preferably 3–15% by weight, based on the catalyst.

The spheroidal hydrogels or spheroidal carriers which have been immersed in the active metal compound as heretofore mentioned are dried at a temperature ranging from room temperature to 200° C. and thereafter calcined for 1–5 hours at a temperature of 350–800° C., and preferably 450–700° C. If the metallic component-bearing spheroidal gels are calcined at a temperature exceeding 800° C., sintering of the catalyst takes place and an effective activity cannot be expected.

(2) As another method for supporting the metallic component with the alumina or silica-alumina carriers, there is one wherein the alumina or silica-alumina hydrogels are ground as desired, after which the ground hydrogels are kneaded together with one of the aforesaid compounds of active metal components, or an aqueous solution thereof. This is followed, if necessary, by adjusting the water content of the mixture to usually 50–90% by weight, and preferably 60–80% by weight, by an optional operation such as compression, drying or centrifuging, and molding the mixture into columns, tablets and the like. The size of the extrusion molded product is preferably adjusted so that the size as the final catalyst falls within the range of 0.5 mm.–5 mm. in diameter. The extrusion molded product is then dried and calcined under the temperature conditions indicated in (1), above.

(3) Still another catalyst supporting method of the present invention is carried out in the following manner. The alumina or silica-alumina hydrogels are submitted to the treatment described in the case of the method of (2), above, except that the active metallic component is not kneaded together. The hydrogels are formed, as previously described in (2), above, into small masses having the form of tablet or column. Next, these small massy hydrogels or carriers which have been obtained by drying or calcining the hydrogels under the conditions described in (1), above, are impregnated with the aforesaid metallic component. This is followed by drying and calcining them under the conditions described in (1), above.

The so obtained catalyst, depending upon the class of the active metallic component, is used in the hydrodesulfurization reaction in its as-obtained state, or after first reducing it with hydrogen and, if desired, presulfiding it with such as $H_2S$ or $CS_2$ is customary manner.

The catalyst obtained by the method described above has a greater compression strength than the conventional catalysts. The spheroidal catalyst possesses an especially high strength. Further, when the foregoing catalyst is used and the hydrodesulfurization of various hydrocarbon-containing stock is carried out, not only is the catalytic activity outstanding, but also the formation of cracked light oils is less than in the case of the use of the conventional catalysts. And particularly, when this catalyst is used for the hydrodesulfurization of the heavy oils contining distillation residual oil, the decrease in the asphaltenes and metals contained in the stock is small, and hence the decline in catalytic activity is also small.

The mode of reaction to be used in the present invention may be either batch-wise or continuous. Further, in the case of the continuous mode, the various known methods such as the fixed, moving and fluidized beds can be used.

The petroleum hydrocarbon containing asphaltenes is used as the feed stock in this invention. Useable as the petroleum hydrocarbon is, for example, crude oil as well as the normal atmospheric pressure distillation residual oil and the reduced pressure distillation residual oil obtained at the petroleum refineries. A petroleum hydrocarbon oil containing 2–7% by weight of sulfur is generally preferred for use in the invention process.

While the reaction conditions will vary depending upon the properties of the stock oil and the properties desired in the final product, generally speaking, the petroleum hydrocarbon oil is contacted in the presence of hydrogen with the hereinbefore described hydrodesulfurization catalyst packed in the reaction tower, at a temperature of 200–500° C., and preferably 350–450° C., and a pressure of 10–300 kg./cm.$^2$ gauge, and preferably 100–300 kg./cm.$^2$ gauge. At this time the liquid hourly space velocity (LHSV) of the feed stock is maintained at 0.2–10 vol./vol./hr., and preferably 0.5–2 vol./vol./hr., and the flow ratio of the hydrogen to the feed stock oil is preferably maintained at 150–3000 l-NTP/l of the feed stock oil.

The refined oil leaving the reaction tower, after having been separated of its gas, is submitted to either steam stripping, reduced pressure steam stripping, reduced pressure distillation or normal pressure distillation, or a combination of these treatments to eliminate the dissolved gas and the low boiling constituents such as cracked light oils.

Thus, in accordance with the invention process, it becomes possible to remove at least 50%, and suitably at least 70% of the sulfur of the feed stock hydrocarbon oil by using the hydrodesulfurization catalyst which is supported by a specific alumina or silica-alumina carrier. According to the present invention, a desulfured heavy oil fraction can be obtained in high yield on this occasion without substantially cracking the feed stock hydrocarbon oil. Furthermore, when use is made of the invention catalyst, the deposition on the catalyst surface of asphaltenes and impure metals such as nickel and vanadium that are contained in the feed stock hydrocarbon is controlled and, as consequence, there is the advantage that with life of the catalyst being very long it becomes possible to operate over a prolonged period of time. In addition, since the catalyst used in the invention process has mechanical strengths, for example, compression strength and resistance to attrition which are very much greater than the known catalysts of this kind, it can be regenerated and repeatedly used over a long period of time.

The following examples are given for further illustration specifically of the nature and effects of the present invention it being understood the invention is not intended to be limited to these examples.

EXAMPLE 1

Finely divided calcium carbonate was gradually added at room temperature to an aqueous aluminum sulfate solution with vigorous stirring, whereupon was obtained as a supernatant liquid an aqueous colloidal solution of basic aluminum sulfate containing 113.8 g./l. of $Al_2O_3$ and 86.5 g./l. of $SO_3$ (mol ratio of $SO_3/Al_2O_3=0.97$). This colloidal solution and a silica sol containing 72.2 g./l. of $SiO_2$ were both removed of their dissolved gas by deaeration for 2 hours under reduced pressure, following which one liter of the aqueous colloidal solution of basic aluminum sulfate and 100 cc. of the silica sol were intimately mixed. This solution was converted into hydrogels 2–4 mm. in diameter by passing the solution through spindle oil of 8-meter height heated at 85° C. The resulting hydrogels were transferred to a tank filled with water, and a part of the sulfate radicals in the hydrogels was eliminated by water-washing for 20 hours while flowing lukewarm water. After completion of the water-washing operation, the molar ratio of $SO_3/Al_2O_3$ was 0.55.

Next, ammonia water of 4% concentration was gradually added while circulating hot water of 55° C. in the tank, the pH being raised from 4.3 to 9.6 over a period of 9 hours. This was followed by water-washing until no sulfate radicals could be noted.

After completion of the water-washing, the hydrogels were dried and then calcined for 3 hours at 500° C. to obtain spheroidal silica-alumina 1–2 mm. in diameter. Of these, those having a diameter of 1.5 mm. were screened and used as the carrier.

Next, 280 cc. of water were added to 264.5 grams of ammonium molybdate followed by adding 525 cc. of 28% ammonia water with stirring to prepare a completely dissolved aqueous solution. Separately, a solution in 208.5 cc. of water of 211.4 grams of cobalt nitrate was prepared. The cobalt nitrate solution was then gradually added dropwise to the ammonium molybdate solution with stirring to effect the mixing and dissolution of the former in the latter. In 1000 cc. of the resulting mixed solution 279.5 grams of the aforesaid silica-alumina carrier were immersed for 3 hours followed by drying of the impregnated carriers for about 5 hours at 110° C. and finally calcining the same for 3 hours at 500° C.

The foregoing catalyst contained 9.82% by weight of molybdenum, 3.10% by weight of cobalt and 7.11% by weight of silica and its packed density was 0.60 g./cc., while its compression strength averaged 85 kg., a value much greater than the conventional catalysts.

By way of comparison, a carrier having a diameter of 1.5 mm. was prepared by adding silica gel to an alumina hydrogel obtained by precipitation from aluminum nitrate and ammonia water, adjusting the silica content to the same as mentioned above and extrusion-molding it, and the carrier was made to support the active metal in the same amount as above in the same manner.

The hydrodesulfurization of the normal pressure distillation residual oil of Khafji crude oil was carried out by means of a fixed bed reaction tower using the foregoing catalysts. After packing the catalysts in the tower they were presulfided before being used, using a mixed gas of hydrogen sulfide and hydrogen. The reaction conditions were as follows: a temperature of 400° C., a pressure of 150 kg./cm.² g., a liquid hourly space velocity of the feed stock oil of 1 vol./vol./hr., and a flow ratio of the hydrogen to the feed stock oil of 1000 l.–NTP/l. The desulfured oil leaving the reaction tower was submitted to reduced pressure steam stripping to distill off and remove the hydrogen sulfide, other gases and cracked light oils thereby obtaining the final product. In Table I are shown the results obtained on the 50th hour after the experiment was started. On the other hand, Table II shows the change in total sulfur content of the product at intervals up to 100 hours.

As apparent from a comparison with Comparison 1, when the invention catalyst is used, the desulfurization rate is great, the amount of cracked light oils is small and the decrease in the asphaltene portion, vanadium and nickel is small. Further, it is also superior in that the rate of decrease in the desulfurization activity is small and the life is longer than that of the catalyst of Comparison 1.

TABLE I

| | Amount of cracked light oils produced, wt. percent based on feed stock | Viscosity, cst. at 50° C. | Total sulfur, wt. percent | Asphaltene portion,[1] wt. percent | Metal, p.p.m. Vanadium | Metal, p.p.m. Nickel |
|---|---|---|---|---|---|---|
| Experiment: | | | | | | |
| Feed stock oil | | 915.7 | 4.30 | 9.31 | 82 | 28 |
| Example 1 | 2.2 | 403.4 | 0.88 | 6.81 | 58 | 20 |
| Comparison 1 | 5.7 | 305.7 | 0.98 | 4.61 | 43 | 16 |

[1] Petroleum ether-insoluble portion.

TABLE II

| | Total sulfur, wt. percent | | |
|---|---|---|---|
| | After 5 hours | After 50 hours | After 100 hours |
| Experiment: | | | |
| Example 1 | 0.73 | 0.88 | 0.90 |
| Comparison 1 | 0.81 | 0.98 | 1.15 |

EXAMPLE 2

After adding 280 cc. of water to 264.2 grams of ammonium molybdate, 525 cc. of 28% ammonia water were added with stirring to prepare a completely dissolved solution. Separately, an aqueous solution consisting of 131.1 grams of cobalt nitrate and 72.7 grams of nickel nitrate in solution in 104.3 cc. of water was prepared, following which the latter solution containing the cobalt and nickel nitrates was gradually added dropwise with stirring to the former ammonium molybdate solution to prepare a mixed solution.

284.3 grams of a spherical silica-alumina carrier made as in Example 1 but having a silica content of the catalyst of 10.52% by weight were immersed for 3 hours in 1000 cc. of the foregoing metallic mixture solution followed by drying for about 5 hours at 120° C. and calcining for 3 hours at 550° C. The resulting catalyst contained 9.68% by weight of molybdenum, 1.42% by weight of cobalt, 0.98% by weight of nickel and 10.52% by weight of silica and its packed density was 0.62 g./cc. On the other hand, the compression strength averaged 87 kg., a much greater value than that of the conventional catalysts.

The hydrodesulfurization of normal pressure distillation residual oil of Khurusanya crude oil was carried out by means of a fixed bed filled with the foregoing catalyst. By way of comparison, commercial spheroidal alumina 1.5 mm. in diameter consisting of eta-alumina was immersed in an aqueous solution of active metal compounds of the same composition as that described above followed by the same treatment thereby preparing a catalyst containing 10.24% by weight of molybdenum, 1.53% by weight of cobalt and 1.04% by weight of nickel. A hydrodesulfurization experiment was conducted with this catalyst under identical conditions as in Example 2. The results obtained are shown as those of Comparison 2.

Further, a carrier prepared as in Example 2 was impregnated with the same amount of the metals by the same procedure, then dried and calcined for 3 hours at 300° C. The so prepared catalyst was used and a hydrodesulfurization experiment was carried out under identical conditions as in Example 2. The results obtained in this case are shown as those of Comparison 3. In both cases the presulfiding of the catalyst was not carried out and the reaction conditions were as follows: a temperature of 395° C., a pressure of 135 kg./cm.² g., a liquid hourly space velocity of the feed stock oil of 1 vol./vol./hr. and a flow ratio of the hydrogen to the feed stock oil of 1100/l.–NTP/l. The desulfured oil leaving the reaction tower was submitted to steam stripping to distill off and remove the hydrogen sulfide, other gases and cracked light oils, thus obtaining the final product.

The results obtained on the 50th hour after the experiments were started are shown in Table III.

As is apparent from Table III, when the hydrodesulfurization was carried out according to the present invention, the amount of cracked light oils formed was less than the case of Comparison 2 wherein the catalyst was prepared by impregnating the commercial eta-alumina with an aqueous solution of the active metal compounds. The decline in viscosity was also less, and the rate of decrease in the total sulfur and residual carbon was also greater. In addition, the decrease in asphaltenes, vanadium and nickel was less in the case of the present invention.

Still further, the rate of desulfurization in the case of Example 2 wherein the catalyst was calcined at 550° C. was higher than that of Comparison 3 wherein the calcination was conducted at 300° C. It can thus be appreciated that calcining at a low temperature is undesirable.

Next, 336 cc. of water were added to 317.5 grams of ammonium molybdate followed by the addition of 630 cc. of ammonia water of 28% concentration with stirring to prepare a completely dissolved solution. Separately, an aqueous solution of cobalt nitrate was prepared by dissolving 253.6 grams of cobalt nitrate in 250 cc. of water. The cobalt nitrate solution was then gradually added dropwise to the ammonium molybdate solution with stirring to prepare a mixed solution.

The foregoing spheroidal alumina hydrogels were immersed in the aforesaid mixed solution for 24 hours, then dried for 24 hours in a 105° C. constant temperature tank, and thereafter calcined for 3 hours at 500° C. to obtain the catalyst. The diameter of the catalyst particles was about 1.5 mm. in diameter, and its active metal content was 8.67% by weight of molybdenum and 2.68% by weight of cobalt.

TABLE III

| Experiment | Amount of cracked light oils produced, wt. percent based on feed stock oil | Viscosity, cst. at 50° C. | Total sulfur, wt. percent | Asphaltene portion,[1] wt. percent | Residual carbon, wt. percent | Metal, p.p.m. | |
|---|---|---|---|---|---|---|---|
| | | | | | | Vanadium | Nickel |
| Feed stock oil | | 345.7 | 3.97 | 5.21 | 9.8 | 42 | 16 |
| Example 2 | 3.0 | 126.8 | 0.76 | 4.13 | 4.4 | 35 | 12 |
| Comparison 2 | 6.4 | 97.34 | 1.06 | 2.46 | 5.6 | 19 | 8 |
| Comparison 3 | 3.5 | 118.3 | 1.08 | 3.8 | 5.7 | 31 | 11 |

[1] Petroleum ether-insoluble portion.

Next, in Table IV are shown the changes in the amount of the total sulfur of the product in the foregoing experiments at intervals up to 200 hours after the start of the experiments.

TABLE IV

| | Total sulfur, wt. percent | | | | |
|---|---|---|---|---|---|
| Experiment | After 5 hours | After 50 hours | After 100 hours | After 150 hours | After 200 hours |
| Example 2 | 0.68 | 0.76 | 0.80 | 0.84 | 0.86 |
| Comparison 2 | 0.75 | 1.06 | 1.28 | 1.48 | 1.67 |
| Comparison 3 | 0.82 | 1.08 | 1.28 | 1.43 | 1.55 |

As is apparent from Table IV, the decline in the desulfurization rate was smaller when the hydrodesulfurization was carried out in accordance with the present invention, as compared with those of Comparisons 2 and 3.

EXAMPLE 3

Finely divided calcium carbonate was gradually added to a saturated aqueous aluminum sulfate solution at room temperature with vigorous stirring to obtain as a supernatant liquid an aqueous colloidal solution of basic aluminum sulfate containing 115.4 g./l. of $Al_2O_3$ and 118.6 g./l. of $SO_3$ (molar ratio of $SO_3/Al_2O_3=1.31$).

This sol was deaerated for 5 hours at reduced pressure to remove its dissolved gas, after which water was added thereto at the rate of 50 cc. per liter of sol. This liquid was then immediately added dropwise from the top of a 10-meters light oil tank maintained at a temperature of 80° C. to form spheroidal hydrogels 3–5 mm. in diameter. The resulting hydrogels were transferred to a tank filled with water and were water-washed by flowing fresh hot water for 24 hours, thus eliminating a part of the sulfate radicals in the hydrogels by hydrolysis. After completion of the water-washing, the molar ratio of $SO_3/Al_2O_3$ in the hydrogels was 0.62.

Next, a tank in which the alumina hydrogels were placed was filled with ammonia water of 0.3% concentration, which was heated to a temperature of 55° C. and then withdrawn. By repeating this operation five times the pH of the liquid was raised to 8.5, thus converting the remaining sulfate radicals to ammonium sulfate. This was followed by water-washing until no further sulfates could be observed. Thus were obtained the spheroidal hydrogels.

By way of comparison, commercial spheroidal gamma-alumina 1.5 mm. in diameter was immersed in an active metal mixed solution of the same composition as hereinabove described, and a catlyst containing 9.25% by weight of molybdenum and 2.83% by weight of cobalt was obtained.

The packed density and the compression strength of the foregoing two catalysts are shown in Table V.

TABLE V

| | Packed density, g./cc. | Compression strength, average value kg. |
|---|---|---|
| Invention catalyst | 0.93 | 76 |
| Comparison catalyst | 0.84 | 22 |

As is apparent from Table V, the catalyst used in the present invention has a compression strength of much greater value than that of the comparison catalyst prepared using the commercially available gamma-alumina.

Next, the hydrodesulfurization of normal pressure distillation residual oil of Khafji crude oil was carried out using fixed bed reaction towers packed with each of the foregoing two catalysts. The catalysts, after having been packed in the reaction towers, were used after they had been presulfided at a temperature of 370° C. and normal atmospheric pressure using 3 moles per liter of hydrogen sulfide containing hydrogen. The reaction conditions were as follows: a temperature of 400° C., a pressure of 130 kg./cm.[2] g., a liquid hourly space velocity of the feed stock oil of 1 vol./vol./hr., and a flow ratio of the hydrogen to the feed stock oil of 850 l.-NTP/l. The desulfured oil leaving the reaction tower was submitted to steam stripping under reduced pressure to distill off and eliminate the hydrogen sulfide, other gases and cracked light oils, thus obtaining the final product.

The results obtained on the 50th hour after the start of the operation are shown in Table VI.

TABLE VI

| Experiment | Amount of cracked light oils produced, wt. percent based on feed stock oil | Viscosity, cst. at 50° C. | Total sulfur, wt. percent | Asphaltene portion,[1] wt. percent | Residual carbon, wt. percent | Metal, p.p.m. | |
|---|---|---|---|---|---|---|---|
| | | | | | | Vanadium | Nickel |
| Feed stock oil | | 910.4 | 4.15 | 9.24 | 11.8 | 84 | 25 |
| Example 3 | 2.3 | 424.7 | 0.78 | 7.46 | 9.4 | 67 | 21 |
| Comparison 4 | 6.3 | 236.5 | 1.15 | 3.29 | 4.1 | 30 | 9 |

[1] Petroleum ether-insoluble portion.

As is apparent from Table VI, the amount of cracked light oils produced in the case of the invention process is less than in the case of the comparison using as catalyst one which uses the commercially available gamma-alumina as the carrier. The decline of the viscosity was also less. Furthermore, the rate of desulfurization was much higher when the invention process was used and the decrease in the asphaltenes, residual carbon, vanadium and nickel was less.

EXAMPLE 4

Finely divided calcium carbonate was gradually added at room temperature to a saturated aqueous aluminum sulfate solution with vigorous stirring to obtain as a supernatant liquid an aqueous colloidal solution of basic aluminum sulfate containing 109.7 g./l. of $Al_2O_3$ and 87.7 g./l. of $SO_3$ (molar ratio of $SO_3/Al_2O_3=1.02$). This solution and a silica sol containing 71.5 g./l. of $SiO_2$ were separately removed of their dissolved gas by deaerating for 2 hours under reduced pressure, after which one liter of the former and 100 cc. of the latter were intimately mixed. This mixed solution was added dropwise to a light oil heated at 90° C., using the same apparatus as in Example 3, to transform it into spheroidal hydrogels 3–5 mm. in diameter. The resulting hydrogels were transferred to a tank filled with water and by washing therein with six changes of the water a part of the sulfate radicals in the hydrogels was removed. After completion of the water-washing, the molar ratio of $SO_3/Al_2O_3$ in the hydrogels was 0.49.

Next, ammonia water of a concentration of 5% was gradually added to a tank containing the silica-alumina hydrogels while circulating hot water of 50° C. to raise the pH from 3.8 to 9.2 over a period of 10 hours. This was followed by water-washing until sulfate radicals could no longer be observed. Thus, the spheroidal silica-alumina hydrogels were obtained.

Next, 280 cc. of water were added to 264.2 grams of ammonium molybdate followed by addition of 525 cc. of ammonia water of 28% concentration with stirring to obtain a completely dissolved solution. Separately, an aqueous solution of 72.7 grams of nickel nitrate in 208.5 cc. of water was prepared, following which this solution was gradually added dropwise to the ammonium molybdate solution to prepare a mixed solution.

The hereinbefore described silica-alumina hydrogels were immersed in the foregoing mixed solution for 24 hours, then dried for 20 hours in a constant temperature tank of 120° C., and thereafter calcined for 3 hours at 550° C. to obtain a catalyst the particles of which were about 1.5 mm. in diameter. The so obtained catalyst contained 10.13% by weight of molybdenum and 2.97% by weight of nickel and the ratio of $SiO_2/(Al_2O_3+SiO_2)$ was 8.4%.

For purpose of comparison, a 4 N ammonia water was gradually added to 10% aqueous solution of aluminum nitrate until a pH of 10 was attained. The alumina hydrogels obtained by allowing the foregoing solution to stand for 24 hours followed by filtration and washing were extrusion molded and dried. These alumina hydrogels were immersed in an active metal mixed solution of an identical composition as hereinabove described, then dried and calcined to obtain a catalyst whose particle diameter was 1.5 mm. The active metal content of this comparison catalyst was 10.47% by weight of molybdenum and 3.08% by weight of nickel.

The packed density and comparison strength of the foregoing two classes of catalysts are shown in Table VII.

TABLE VII

| | Packed density, g./cc. | Compression strength, average value kg. |
|---|---|---|
| Present invention | 0.58 | 82 |
| Comparison | 0.72 | 7 |

As is apparent from Table VII, a compression strength of a very great value is shown by the catalyst used in the present invention in spite of the fact that its packed density is smaller than that of the comparison catalyst.

Fixed beds packed with each of the foregoing two classes of catalysts were used and the hydrodesulfurization of normal pressure distillation residual oil of Khurusanya crude oil was carried out. The catalysts, after being packed in the reaction tower, were used immediately without a presulfiding treatment. The reaction conditions were as follows: a temperature of 390° C., a pressure of 140 kg./cm.² g., a liquid hourly space velocity of 1 vol./vol./hr., and a hydrogen to the feed stock oil flow ratio of 1000 l.-NTP/l. The desulfured oil leaving the reaction tower was then submitted to a steam stripping operation to distill off and eliminate the hydrogen sulfide, other gases and cracked light oils to thus obtain the final product. The analysis results of the product obtained on the 50th hour after the start of the operation are shown in Table VIII.

TABLE VIII

| Experiment | Amount of cracked light oils produced, wt. percent based on feed stock oil | Viscosity, cst. at 50° C. | Total sulfur, wt. percent | Asphaltene portion,[1] wt. percent | Residual carbon, wt. percent | Metal, p.p.m. | |
|---|---|---|---|---|---|---|---|
| | | | | | | Vanadium | Nickel |
| Feed stock oil | | 354.6 | 3.92 | 5.48 | 10.2 | 45 | 18 |
| Example 4 | 2.7 | 143.5 | 0.78 | 3.89 | 7.3 | 33 | 13 |
| Comparison 5 | 7.1 | 98.43 | 1.19 | 2.14 | 3.8 | 17 | 7 |

[1] Petroleum ether-insoluble portion.

As is apparent from Table VIII, when the invention catalyst was used, the amount of cracked light oils produced and decrease in viscosity were less than in the case of the comparison which uses as catalyst one prepared with aluminum nitrate as the starting material. On the other hand, the rate of desulfurization was higher, while the decrease in asphaltenes, residual carbon, vanadium and nickel were small in the case of the invention catalyst.

The changes in the total sulfur in the product in the foregoing operation at intervals up to 150 hours from the start of the operation are shown in Table IX.

TABLE IX

| Experiment | Total sulfur, wt. percent | | | |
|---|---|---|---|---|
| | After 5 hours | After 50 hours | After 100 hours | After 150 hours |
| Example | 0.67 | 0.78 | 0.83 | 0.86 |
| Comparison 5 | 0.87 | 1.9 | 1.45 | 1.69 |

It can be seen from Table IX that when the invention catalyst is used, the decrease in the rate of desulfurization is less than in the case of the comparison catalyst and the activity was maintained over a longer period of time.

EXAMPLE 5

Finely divided calcium carbonate was gradually added at room temperature to a saturated aqueous solution of aluminum sulfate with vigorous stirring to obtain as a supernatant liquid an aqueous colloidal solution of basic aluminum sulfate containing 121.5 g./l. of $Al_2O_3$ and 119.3 g./l. of $SO_3$ (molar ratio of $SO_3/Al_2O_3=1.25$).

This sol was removed of its dissolved gas by deaeration for 4 hours under reduced pressure, to which was then added water at the rate of 150 cc. per liter of the sol, following which this liquid was dropped from the top of a tank filled with spindle oil to a height of 8 meters, whose temperature was maintained at 90° C. The drops of sol became heated during their descent to become hydrogels 2–4 mm. in diameter. The hydrogels at the bottom of the tank were transferred to a tank filled with water. By replacing the tank with fresh hot water seven times, the sulfate radicals bound to the hydrogels were removed by hydrolysis, and the molar ratio of $SO_3/Al_2O_3$ was reduced to about 0.6.

After freeing the hydrogels of water, their pH was gradually raised by first immersing in a urea solution of 1% concentration where they were heated at 90° C. for 8 hours. After removing the urea solution, they were submerged in ammonia water of 2% concentration and heated for 6 hours at 50° C. to convert the sulfate radicals remaining in the hydrogels to ammonium sulfate. Next, water was added and washing with water was carried out until sulfates could no longer be observed.

After the water washing, the hydrogels were dried in a 120° C. constant temperature tank followed by calcining for 3 hours at 550° C., thus obtaining spheroidal aluminas 1–2 mm. in diameter. Of these, those having a diameter of 2 mm. were screened and used as the catalyst carrier.

Next, 280 cc. of water were added to 264.5 grams of ammonium molybdate, to which were added 525 cc. of 28% ammonia water with stirring to obtain a completely dissolved mixture. Separately, an aqueous solution of 211.4 grams of cobalt nitrate in 208.5 cc. of water was prepared. The cobalt nitrate solution was then gradually added dropwise to the ammonium molybdate solution to prepare a mixed solution.

481 grams of the previously prepared spheroidal alumina carrier were immersed for 6 hours in 1000 cc. of the so obtained mixed solution followed by drying for about 5 hours at 110° C. and also calcining for 3 hours at 500° C. to obtain the catalyst.

The catalyst obtained in the manner hereinabove described contained 10.96% by weight of molybdenum and 3.16% by weight of cobalt and its packed density was 0.95 g./cc. Further, its compression strength averaged 90 kg., which was a very large value when compared with the 5–40 kg. of that of the catalyst using the conventional alumina as the carrier.

The hydrodesulfurization of normal pressure distillation residual oil of Khafji crude oil was carried out by means of a fixed bed packed with the foregoing catalyst. By way of comparison, the same experiment was carried out using as catalysts those prepared by the same immersion method and deposited with the same amount of molybdenum and cobalt, using in one case a carrier 1.5 mm. in diameter consisting principally of gamma-alumina prepared by extrusion molding the alumina hydrogels obtained by precipitation from aluminum nitrate and ammonia water, and in the other case the commercially available spheroidal activated alumina carrier 2.0 mm. in diameter. Both catalysts, after being packed in the reaction towers were, before using, presulfided, using a mixed gas of hydrogen sulfide and hydrogen. The reaction conditions were as follows: a temperature of 400° C., a pressure of 150 kg./cm.$^2$ g., a liquid hourly space velocity of the feed stock oil of 1 vol./vol./hr., and a hydrogen to the feed stock oil flow ratio of 1000 l.-NTP/l. The desulfured oil leaving the reaction tower was submitted to steam stripping to distill off and remove the hydrogen sulfide, other gases and cracked light oils, thus obtaining the final product.

The results obtained on the 50th hour after the start of the experiment are shown in Table X.

TABLE X

| Experiment | Amount of cracked light oils produced, wt. percent based on feed stock oil | Viscosity, cst. at 50° C. | Total sulfur, wt. percent | Asphaltene portion,[1] wt. percent | Residual carbon, wt. percent | Metal, p.p.m. | |
|---|---|---|---|---|---|---|---|
| | | | | | | Vanadium | Nickel |
| Feed stock oil | | 915.7 | 4.30 | 9.31 | 12.5 | 82 | 28 |
| Example 5 | 2.5 | 432.5 | 0.85 | 7.50 | 10.8 | 67 | 22 |
| Comparison 6 [2] | 5.7 | 305.7 | 0.98 | 4.61 | 6.3 | 43 | 16 |
| Comparison 7 [3] | 7.3 | 253.4 | 1.15 | 3.11 | 4.4 | 31 | 11 |

[1] Petroleum ether-insoluble portion.
[2] Alumina carried from aluminum nitrate used.
[3] Commercial spheroidal activated alumina used.

As is apparent from the foregoing table, the amount produced of the cracked light oils and the decrease in viscosity were the least in the case where the invention catalyst was used. The decrease in the total sulfur was greater than in the case of the two comparison catalysts, while the decrease in the asphaltene portion, residual carbon, vanadium and nickel was the least in the case of the invention catalyst. The changes in the total sulfur content of the products at intervals up to 200 hours after the start of the experiment and the amount of carbon deposit on catalysts after 200 hours of use are shown in Table XI.

As is apparent from Table XI, the decline in the rate of desulfurization was the least when the hydrodesulfurization was carried out using the catalyst of the present invention, as compared with the instances where the hydrodesulfurization was carried out using the comparison catalysts. Again, the amount of carbon deposit on the catalyst was also considerably less in the case of the former as compared with the latter.

TABLE XI

| Experiment | Total sulfur, wt. percent | | | | | Amount of carbon deposit after 200 hours of use, wt. percent |
|---|---|---|---|---|---|---|
| | After 5 hrs. | After 50 hrs. | After 100 hrs. | After 150 hrs. | After 200 hrs. | |
| Example 5 | 0.75 | 0.85 | 0.87 | 0.90 | 0.91 | 6.5 |
| Comparison 6 [1] | 0.81 | 0.98 | 1.15 | 1.30 | 1.45 | 13.8 |
| Comparison 7 [2] | 0.79 | 1.15 | 1.40 | 1.62 | 1.83 | 18.5 |

[1] Alumina carrier from aluminum nitrate used.
[2] Commercial activated alumina carrier used.

EXAMPLE 6

One liter of an aqueous colloidal solution of basic aluminum sulfate prepared as in Example 1 and containing 107.2 g./l. of $Al_2O_3$ and 80.0 g./l. of $SO_3$ (molar ratio of $SO_3/Al_2O_3=0.95$) and 100 cc. of a silica sol containing 68.1 g./l. of $SiO_2$ were intimately mixed. This solution was dropped into a light oil heated at 93° C., using the apparatus as used in Example 1 to form spheroidal hydrogels 5–10 mm. in diameter. The resulting hydrogels were transferred to a tank filled with water and washed with six changes of water. A part of the sulfate radicals inside the hydrogels was thus removed. After completion of the water-washing, the molar ratio of $SO_3/Al_2O_3$ in the hydrogels was 0.54.

Next, the tank was filled with ammonia water of 5% concentration and by heating at 50° C. the remaining sulfate radicals were converted to ammonium sulfate, after which water-washing was carried out until no further sulfate radicals could be detected. The so obtained spheroidal silica-alumina hydrogels had a water content of 91.6% by weight which could be removed by heating at 150° C.

3.343 grams of the hydrogels obtained as hereinbefore described were mixed with 236.5 cc. of the mixed aqueous solution of ammonium molybdate and cobalt nitrate, as used in Example 3. After thorough kneading of the mixture, it was dried at 110° C. until its water content became such that it was suitable for extrusion molding. After drying, it was again kneaded so as to ensure its homogeneity and then it was extrusion molded followed by drying for 5 hours at 110° C. and finally calcining for 3 hours at 500° C.

The catalyst obtained in the above manner had a diameter of 1.5 mm. and it contained 9.96% by weight of molybdenum and 3.12% by weight of cobalt and its weight ratio of $SiO_2/(Al_2O_3+SiO_3)$ was 8.6%.

For purpose of comparison, an extrusion molded catalyst 1.4 mm. in diameter containing 11.24% by weight of molybdenum and 3.52% by weight of cobalt was prepared by the same method of preparation hereinabove described using alumina hydrogels obtained by precipitation from aluminum nitrate and ammonia water at a pH of 10.

The packed density and compression strength of the foregoing two classes of catalysts are shown in Table XII.

TABLE XII

| Catalyst | Diameter of particles, mm. | Packed density, g./cc. | Compression strength, average value, kg. |
|---|---|---|---|
| Invention catalyst | 1.5 | 0.56 | 22 |
| Comparison catalyst | 1.4 | 0.73 | 5 |

As is apparent from Table XII, the catalyst as used in the present invention, when compared with the comparison catalyst prepared from aluminum sulfate, has a far greater compression strength despite of its smaller filled density.

The hydrodesulfurization of normal pressure distillation residual oil of Khafji crude oil was carried out by means of a fixed bed packed with the foregoing two classes of catalysts. The catalysts, after having been packed, were first presulfided at normal atmospheric pressure and a temperature of 350° C. using hydrogen containing 3 mol percent of hydrogen sulfide before using. The reaction conditions were as follows: a temperature of 400° C., a pressure of 150 kg./cm.$^2$ g. a liquid hourly space velocity of the feed stock oil of 0.8 vol./vol./hr., and a hydrogen to the feed stock oil flow ratio of 1200 l.-NTP/l. The desulfured oil leaving the reaction tower was submitted to steam stripping to distill off and eliminate the hydrogen sulfide, other gases and cracked light oils, thus obtaining the final product. The results of an analysis of the product on the 100th hour after the start of the operation are shown in Table XIII.

TABLE XIII

| Experiment | Amount of cracked light oils produced, wt. percent based on feed stock oil | Viscosity, cst. at 50° C. | Total sulfur, wt. percent | Asphaltene portion,[1] wt. percent | Residual carbon, wt. percent | Metal, p.p.m. | |
|---|---|---|---|---|---|---|---|
| | | | | | | Vanadium | Nickel |
| Feed stock oil | | 928.5 | 4.36 | 9.42 | 13.7 | 85 | 29 |
| Example 6 | 3.9 | 450.1 | 0.74 | 6.93 | 9.8 | 64 | 20 |
| Comparison 8 | 8.7 | 246.2 | 1.43 | 3.57 | 5.1 | 31 | 11 |

[1] Petroleum ether-insoluble portion.

As is apparent from Table XIII, the desulfurization rate in the case where the invention catalyst was used greatly surpassed that of the case where the comparison catalyst prepared from aluminum nitrate was used. On the other hand, the amount of the cracked light oils produced was less and the decline in viscosity was also less. Moreover, the decrease in asphaltenes, residual carbon, vanadium and nickel was less when the invention catalyst was used.

TABLE XIV

| | Total sulfur, wt. percent | | |
|---|---|---|---|
| | After 5 hours | After 100 hours | After 200 hours |
| Example 6 | 0.56 | 0.74 | 0.79 |
| Comparison 8 | 0.84 | 1.43 | 1.77 |

The changes in the amount of total sulfur of the product at intervals up to 200 hours after the start of the operation in foregoing runs are shown in the Table XIV.

As is apparent from Table XIV, the decline in the desulfurization rate is less when the invention catalyst was used and also the decline in the activity of the catalyst was less.

What we claim is:

1. A process for hydrodesulfurizing petroleum hydrocarbons containing asphaltenes which comprises contacting said petroleum hydrocarbon containing asphaltenes with a hydrodesulfarization catalyst, in the presence of hydrogen at a temperature of 200–500° C. and a pressure of 10–300 kilograms per square centimeter gauge while maintaining the flow ratio of the hydrogen to the feed stock hydracarbons at 150–3000 liters NTP per liter of the feed stock hydrocarbons, said catalyst comprising (A) a carrier of a substantially amorphous alumina obtained by heating an aqueous colloidal solution of basic aluminum sulfate of the composition represented by the formula $Al_2O_3 \cdot (0.8-1.6)SO_3$ at a temperature of 40–100° C. to form hydrogels, adding water to the so obtained hydrogels to adjust the molar ratio of $Al_2O_3:SO_3$ to 1:0.4–0.7, and then treating said hydrogels with a base to remove the sulfate radicals therefrom, and (B) 1 to 20% by weight of a metal supported on said carrier, said metal being selected from the class consisting of the metals of Groups I, VI and VIII of the Periodic Table of Elements, said catalyst being calcined at a temperature ranging from 350° to 800° C.

2. The process of claim 1 wherein said base is selected from the group consisting of urea and ammonia.

3. The process of claim 1 wherein said petroleum hydrocarbon is selected from the group consisting of petroleum crude oil, normal pressure distillation residual oil and reduced pressure residual oil.

4. A process for hydrodesulfurizing petroleum hydrocarbons containing asphaltenes which comprises contacting said petroleum hydrocarbon containing asphaltenes with a hydrodesulfurization catalyst, in the presence of hydrogen at a temperature of 200–500° C. and a pressure of 10–300 kilograms per square centimeter gauge while maintaining the flow ratio of the hydrogen to the feed stock hydrocarbons at 150–3000 liters NTP per liter of the feed stock hydrocarbons, said catalyst comprising (A) a carrier of a substantially amorphous silica-alumina carrier whose weight ratio of $SiO_3/(Al_2O_3+SiO_2)$ is 0.3 or less, said silica-alumina carrier being obtained by heating a mixed solution consisting of an aqueous colloidal solution of basic aluminum sulfate of the composition represented by the formula $Al_2O_3 \cdot (0.8-1.6)SO_3$ and an aqueous sol of silica at a temperature of 40–100° C. to form hydrogels, adding water to the hydrogels thus obtained to adjust the molar ratio of $Al_2O_3:SO_3$ to 1:0.4–0.7 and then treating said hydrogels with a base to remove the sulfate radicals therefrom, and (B) 1 to 20% by weight of a metal supported on said carrier, said metal being selected from the class consisting of the metals of Groups I, VI and VII of the Periodic Table of Elements, said catalyst being calcined at a temperature ranging from 350° to 800° C.

5. The process of claim 4 wherein said base is selected from the group consisting of urea and ammonia.

6. The process of claim 4 wherein said petroleum hydrocarbon is selected from the group consisting of petroleum crude oil, normal pressure distillation residual oil and reduced pressure residual oil.

7. A process for hydrodesulfurizing petroleum hydrocarbons containing asphaltenes which comprises contacting said petroleum hydrocarbon containing asphaltenes with a hydrodesulfurization catalyst, in the presence of hydrogen at a temperature of 200–500° C. and a pressure of 10–300 kilograms per square centimeter gauge while maintaining the flow ratio of the hydrogen to the feed stock hydrocarbon at 150–3000 liters NTP per liter of the feed stock hydrocarbon, said catalyst comprising (A) a substantially amorphous alumina carrier obtained by heating an aqueous colloidal solution of basic aluminum sulfate of the composition represented by the formula $Al_2O_3 \cdot (0.8-1.6)SO_3$ by passing said solution through a water-immiscible suspending liquid medium heated at a temperature of 40–100° C. to form spheroidal hydrogels, adding water to the so obtained hydrogels to adjust the molar ratio of $Al_2O_3:SO_3$ to 1:0.4–0.7, and then treating said hydrogels with a base to remove the sulfate radiacals therefrom, and (B) 1–20% by weight of a metal supported on said carrier, said metal being selected from the class consisting of the metals of Groups I, VI and VIII of the Periodic Table of Elements, said catalyst being calcined at a temperature ranging between 350° and 800° C.

8. The process of claim 7 wherein said base is selected from the group consisting of urea and ammonia.

9. A process for hydrodesulfurizing petroleum hydrocarbons containing asphaltenes which comprises contacting said petroleum hydrocarbon containing asphaltenes with a hydrodesulfurization catalyst, in the presence of hydrogen at a temperature of 200–500° C. and a pressure of 10–300 kilograms per square centimeter gauge while maintaining the flow ratio of the hydrogen to the feed stock hydrocarbon at 150–3000 liters NTP per liter of the feed stock hydrocarbon, said catalyst comprising (A) a substantially amorphous silica-alumina carrier, the weight ratio of $SiO_3/(Al_2O_3+SiO_2)$ of which is 0.3 or less, obtained by heating a mixed solution consisting of an aqueous colloidal solution of basic aluminum sulfate of the composition represented by the formula $$Al_2O_3 \cdot (0.8-1.6)SO_3$$

and an aqueous sol of silica by passing said mixed solution through a water-immiscible suspending liquid medium heated at a temperature of 40–100° C. to form spheroidal hydrogels, adding water to the hydrogels thus obtained to adjust the molar ratio of $Al_2O_3:SO_3$ to 1:0.4–0.7 and then treating said hydrogels with a base to remove the sulfate radicals therefrom, and (B) 1–20% by weight of a metal supported on said carrier, said metal being selected from the class consisting of the metals of Groups I, VI and VIII of the Periodic Table of Elements, said catalyst being calcined at a temperature ranging from 350° to 800° C.

10. The process of claim 7 wherein said base is selected from the group consisting of urea and ammonia.

References Cited

UNITED STATES PATENTS

| | | | |
|---|---|---|---|
| 2,799,661 | 7/1957 | De Rosset | 208—216 |
| 2,913,400 | 11/1959 | Burton et al. | 208—216 |
| 3,016,347 | 1/1962 | O'Hara | 208—216 |
| 3,016,348 | 1/1962 | Holden | 208—216 |
| 3,169,827 | 2/1965 | De Rosset | 208—216 |
| 3,169,931 | 2/1965 | De Rosset | 208—216 |

DELBERT E. GANTZ, Primary Examiner

G. J. CRASANAKIS, Assistant Examiner

U.S. Cl. X.R.

208—217; 252—452